United States Patent
Cho (10) Patent No.: US 8,305,263 B2
(45) Date of Patent: Nov. 6, 2012

(54) GLOBAL POSITIONING SYSTEM RECEIVER AND SATELLITE CLOCK CORRECTING METHOD THEREOF

(75) Inventor: JaeBum Cho, Seoul (KR)

(73) Assignee: Samsung Electronics Co., Ltd. (KR)

(*) Notice: Subject to any disclaimer, the term of this patent is extended or adjusted under 35 U.S.C. 154(b) by 163 days.

(21) Appl. No.: 12/657,513

(22) Filed: Jan. 22, 2010

(65) Prior Publication Data

US 2010/0207814 A1 Aug. 19, 2010

(30) Foreign Application Priority Data

Feb. 16, 2009 (KR) .................. 10-2009-0012492

(51) Int. Cl.
*H01Q 17/00* (2006.01)

(52) U.S. Cl. .................................. 342/357.02
(58) Field of Classification Search .............. 342/357.2, 342/357.02
See application file for complete search history.

(56) References Cited

U.S. PATENT DOCUMENTS

| | | | |
|---|---|---|---|
| 7,769,543 B2* | 8/2010 | Stecko et al. | 701/214 |
| 2006/0170589 A1 | 8/2006 | Park et al. | |
| 2007/0205940 A1* | 9/2007 | Yang et al. | 342/357.12 |
| 2007/0233383 A1 | 10/2007 | Churan | |
| 2008/0037614 A1* | 2/2008 | Douglas | 375/150 |

FOREIGN PATENT DOCUMENTS

| | | |
|---|---|---|
| JP | 2006-220532 A | 8/2006 |
| KR | 10-2006-0087240 A | 8/2006 |
| KR | 10-2007-0050144 A | 5/2007 |

* cited by examiner

*Primary Examiner* — Harry Liu
(74) *Attorney, Agent, or Firm* — Onello & Mello LLP

(57) ABSTRACT

Disclosed is a global positioning system receiver which comprises a satellite signal receiving part constructed and arranged to extract navigation data from a satellite signal received from at least one satellite; a decoder constructed and arranged to decode the navigation data; a satellite location determining part constructed and arranged to determine a location of the at least one satellite according to the decoded navigation data; and a satellite clock correcting part constructed and arranged to calculate a velocity of the at least one satellite and to correct a satellite clock based on at least one of the calculated satellite velocity and the location of the at least one satellite.

10 Claims, 7 Drawing Sheets

GLOBAL POSITIONING SYSTEM RECEIVER AND SATELLITE CLOCK CORRECTING METHOD THEREOF

CROSS-REFERENCE TO RELATED APPLICATIONS

This application claims priority under 35 U.S.C §119 to Korean Patent Application No. 10-2009-0012492 filed Feb. 16, 2009 in the Korean Intellectual Property Office (KIPO), the contents of which are incorporated herein by reference in their entirety.

BACKGROUND

1. Field

Exemplary embodiments relate to a navigation system, and more particularly, to a global positioning system (hereinafter, referred to as GPS) receiver and a satellite clock correcting method thereof.

2. Description of Related Art

A GPS, in general, is a system developed to determine a location of an object. A GPS service enables a user to determine his location by receiving GPS signals from GPS satellites, measuring information related to a current location of the user, and providing the measured information to the user.

In addition, the GPS service is utilized as a navigation service using data such as map information, traffic information, and the like. When a user selects a destination, navigation information, such as traffic information from a current location to the destination or direction information is provided to the user using previously stored map information. Further, a GPS service can be applied to various fields related to positioning, military, aeronautical operational controlling, and the like. Thus, it is possible to acquire location and time information using the GPS service.

A GPS comprises at least one GPS satellite that broadcasts a GPS signal in space and a GPS receiver that provides location information in response to the GPS signal.

A GPS typically includes twenty-four GPS satellites, in practice, twenty-seven GPS satellites including three supplement satellites, having different orbits. This enables the GPS receiver to acquire GPS signals from four or more GPS satellites. Herein, the GPS receiver has to establish contact with or secure four or more GPS satellites in order to acquire four or more GPS signals. The GPS receiver can calculate a pseudo-range, or an approximation of the distance between the GPS satellite and the GPS receiver, in order to acquire location information. For example, the GPS receiver can calculate the pseudo-range by measuring a difference between a time when the GPS satellite broadcasts a satellite signal and a time when the GPS receiver receives the satellite signal.

It is possible to acquire location information based on whether a GPS time stored in a GPS receiver, that is, time derived from a satellite clock, is exact. The GPS receiver can determine a satellite clock using information included in a GPS signal provided by the GPS satellite. A GPS satellite orbits about the earth, and does not remain at a fixed location. However, in cases where information included in a GPS signal can be employed when measuring a satellite clock, satellite circumstance information pertaining to the orbit of a GPS satellite, for example, satellite velocity and location information, is not considered when measuring a satellite clock. Therefore, it is difficult to measure a satellite clock accurately. Accordingly, errors may occur when determining a location.

SUMMARY

One aspect is directed to a global positioning system receiver, which comprises a satellite signal receiving part constructed and arranged to extract navigation data from a satellite signal received from at least one satellite; a decoder constructed and arranged to decode the navigation data; a satellite location determining part constructed and arranged to determine a location of the at least one satellite according to the decoded navigation data; and a satellite clock correcting part constructed and arranged to calculate a velocity of the at least one satellite and to correct a satellite clock based on at least one of the calculated satellite velocity and the location of the at least one satellite.

In an embodiment, the satellite clock correcting part comprises: a satellite velocity calculating part constructed and arranged to calculate the satellite velocity; a satellite clock error calculating part constructed and arranged to calculate a satellite clock error based on the at least one of the calculated satellite velocity and the satellite location; and a time correcting part constructed and arranged to correct the satellite clock based on the satellite clock error.

In an embodiment, the satellite clock error is determined by dividing a result of a satellite velocity and a satellite location by a square of the speed of light.

In an embodiment, the satellite signal receiving part comprises: a correlator constructed and arranged to extract the navigation data based on a coincidence degree between a code of the satellite signal and a code of a copy satellite signal; and a FFT converter constructed and arranged to acquire a Doppler value by Fast Fourier transformation of the navigation data.

In an embodiment, the satellite velocity calculating part is constructed and arranged to calculate the satellite velocity based on the Doppler value.

Another aspect is directed to a method of correcting a satellite clock of a global positioning system receiver. The method comprises extracting navigation data from a satellite signal of at least one satellite; decoding the navigation data; determining a location of the at least one satellite according to the decoded navigation data; calculating a velocity of the at least one satellite; calculating a satellite clock error based on at least one of the velocity and location of the at least one satellite; and correcting a satellite clock based on the satellite clock error.

In an embodiment, the satellite clock error is determined by dividing a result of the satellite velocity and the satellite location by a square of the speed of light.

In an embodiment, extracting the navigation data comprises: extracting the navigation data based on a coincidence degree between a code of the satellite signal and a code of a copy satellite signal; and acquiring a Doppler value by Fast Fourier transformation of the navigation data.

In an embodiment, calculating the satellite velocity includes calculating the satellite velocity based on the Doppler value.

Still another aspect is directed to a method of correcting a satellite clock of a global positioning system receiver. The method comprises acquiring a Doppler value from a satellite signal of at least one satellite; calculating a velocity of the at least one satellite based on the Doppler value; calculating a satellite clock error based on at least one of the velocity and a location of the at least one satellite; and correcting a satellite clock based on the satellite clock error.

In an embodiment, the Doppler value is determined by Fast Fourier transformation of navigation data extracted from the satellite signal.

In an embodiment, the satellite clock error is determined by dividing a result of the velocity and the location by a square of the speed of light.

In an embodiment, a pseudo-range is calculated from the at least one satellite based on the corrected satellite clock; and a location of the global positioning system receiver is determined based on the pseudo-range.

BRIEF DESCRIPTION OF THE FIGURES

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings, the thickness of layers and regions are exaggerated for clarity. In the drawings.

DETAILED DESCRIPTION OF EMBODIMENTS

The inventive concepts are described more fully hereinafter with reference to the accompanying drawings, in which embodiments of the inventive concepts are shown. These inventive concepts may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A GPS receiver according to embodiments may include terminals with a GPS service function, such as a mobile terminal, a notebook, a personal digital assistant (PDA), a smart phone, a portable media player (PMP), a navigator, and the like, or may include one or more terminals, each including a GPS module.

Figure 1:
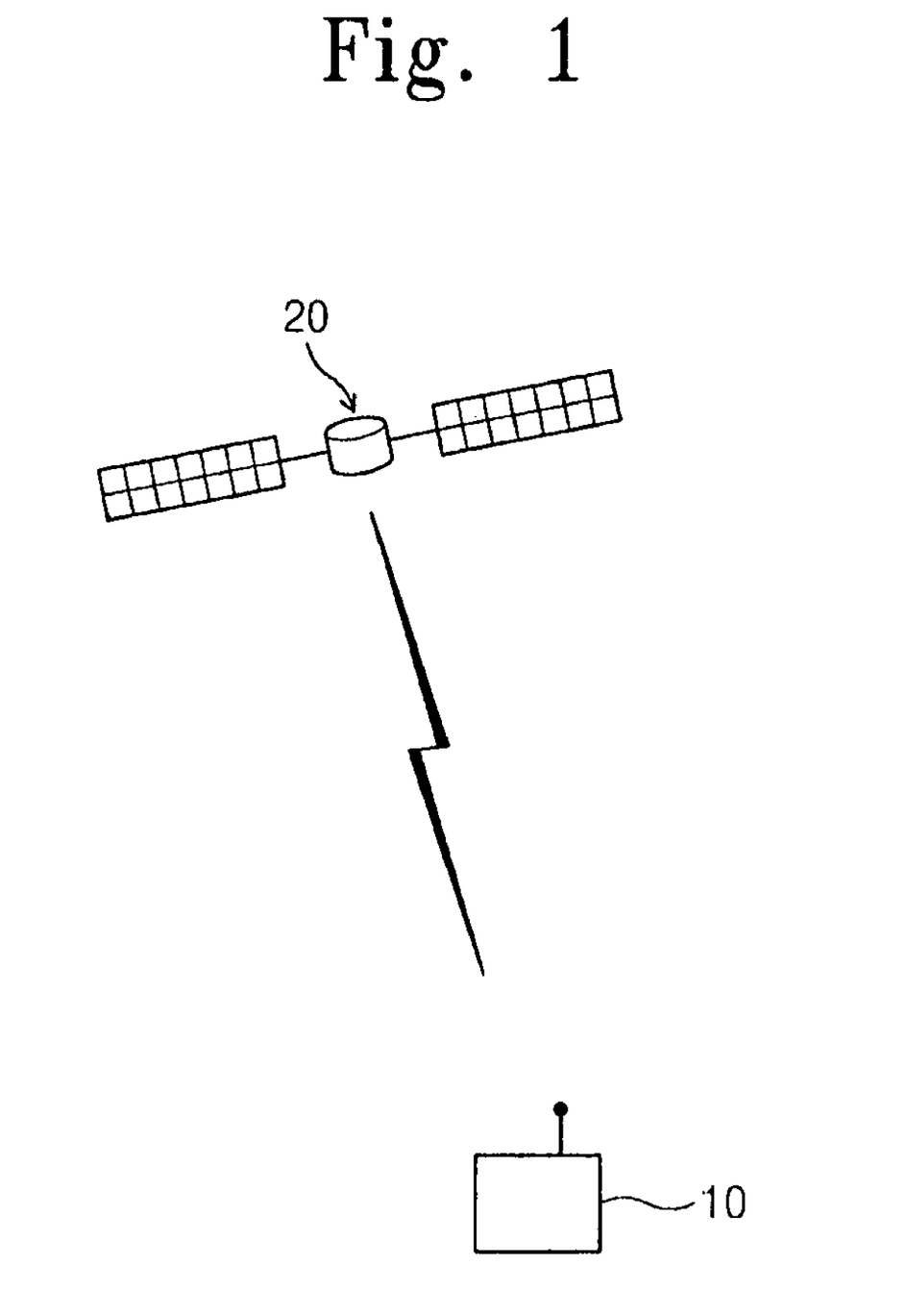
FIG. 1 is a diagram illustrating a global positioning system according to an embodiment.

FIG. 1 is a diagram illustrating a global positioning system according to an embodiment. Referring to FIG. 1, a global positioning system can include a GPS receiver 10 and a GPS satellite 20.

The GPS satellite 20 broadcasts GPS signals at an orbit about the earth at an altitude of about 20,000 km, and the GPS receiver 10 provides location information to a user based on incoming GPS signals broadcast by the satellite 20.

In a GPS, twenty-four GPS satellites rotate along their own orbits. In FIG. 1, one GPS satellite 20 is illustrated for purposes of showing the relationship between a GPS satellite 20 and a receiver 10. The GPS receiver 10 may further receive satellite signals from one or more visible satellites. In an embodiment, the GPS receiver 10 may receive satellite signals from four or more visible satellites to determine a current location of the GPS receiver 10.

In an exemplary embodiment, the GPS receiver 10 can be constructed and arranged to correct a satellite clock using information pertaining to satellite circumstances, for example, location and velocity information of the GPS satellite 20. Herein, the satellite clock may include a GPS time stored in the GPS receiver 10. The GPS receiver 10 may calculate a pseudo-range from the GPS satellite 20 based on the corrected satellite clock signal. When pseudo-ranges from at least four GPS satellites are calculated, a location of the GPS receiver 10 can be determined.

Figure 2:
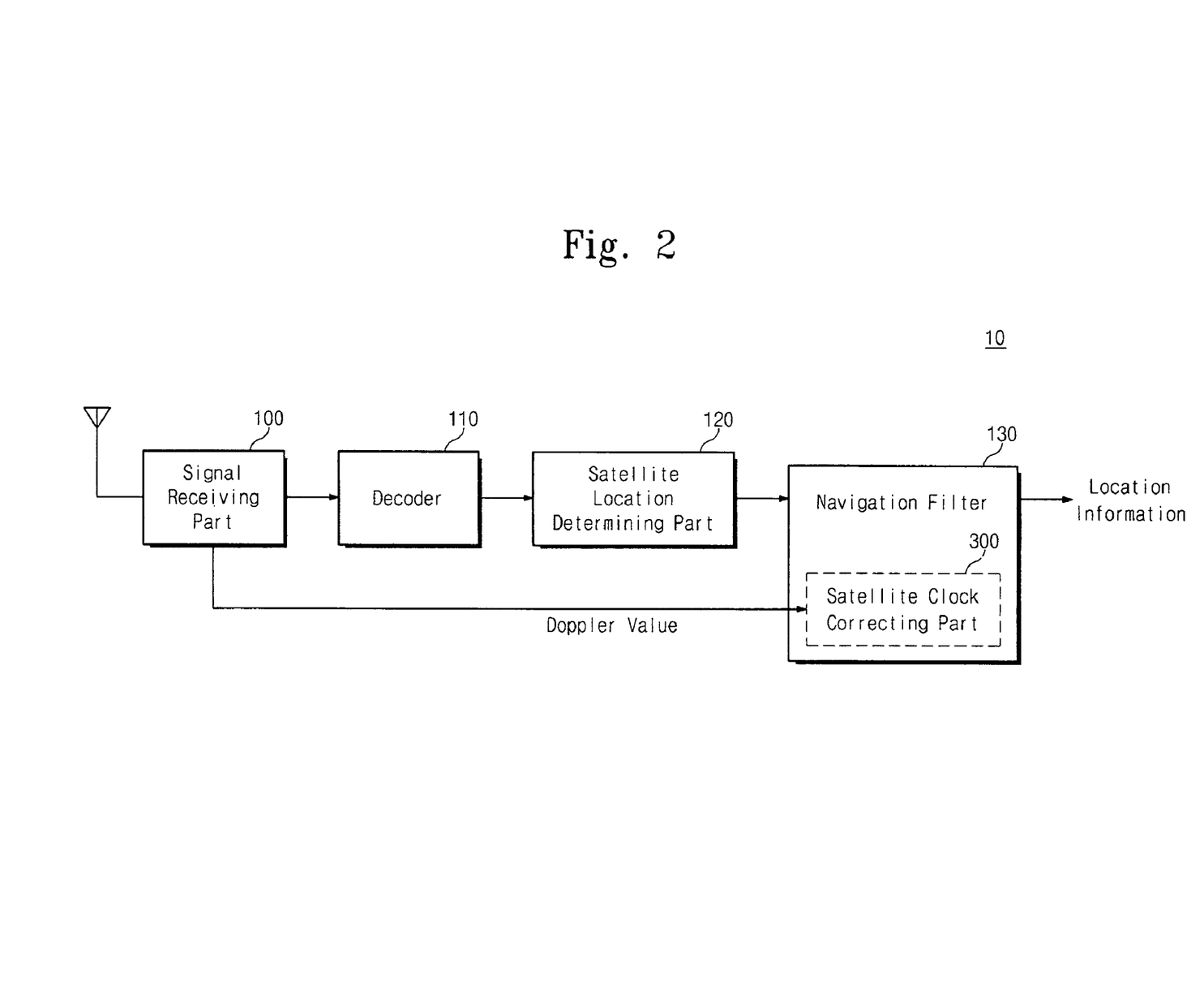
FIG. 2 is a block diagram illustrating a GPS receiver illustrated in FIG. 1.

FIG. 2 is a block diagram illustrating a GPS receiver illustrated in FIG. 1.

Referring to FIG. 2, a GPS receiver 10 can include a signal receiving part 100, a decoder 110, a satellite location determining part 120, and a navigation filter 130.

In an embodiment, the signal receiving part 100 can be a satellite or GPS signal receiving part, and can be constructed and arranged to receive a satellite signal from at least one GPS satellite, for example, GPS satellite 20 shown in FIG. 1. The GPS receiving part 100 can be constructed and arranged to extract navigation data from the incoming satellite signal. Further, the signal receiving part 100 can measure a Doppler deviation amount of the satellite signal by performing a Fast Fourier Transform (FFT). The receiving part 100 may receive a Doppler value according to the measured Doppler deviation amount.

The decoder 110 can be constructed and arranged to decode navigation data. The satellite location determining part 120 can be constructed and arranged to determine a location-in-space of a GPS satellite based on information included in the decoded navigation data. For example, information used to determine a location-in-space of a GPS satellite may include at least one of Almanac information and Ephemeris information included in the navigation data.

The navigation filter 130 can be constructed and arranged to calculate a pseudo-range from a GPS satellite based on the determined location information of the GPS satellite. The navigation filter 130 can be constructed and arranged to determine a location of a GPS receiver 10 based on the calculated pseudo-range. In an embodiment, the navigation filter 130 can be a Kalman filter. The Kalman filter is an efficient recursive filter that estimates the state of a linear dynamic system from a series of noisy measurements. The Kalman filter uses a constant velocity model of a system equation with respect to a location, a velocity, a time error, a time error variation rate, etc., and a measurement equation of the Kalman filter indicates a pseudo-range.

The navigation filter 130 may determine not only a location of the GPS receiver 10 but also a velocity of the GPS receiver 10. The navigation filter 130 may provide the determined location or velocity information of the GPS receiver 10 to a location information output part. The location information output part can be formed of a display part, an audio part, and the like and can convert the location/velocity information of the GPS receiver 10 into data having an appropriate format (for example, image data or audio data).

The navigation filter 130 according to an embodiment of the inventive concept can include a satellite clock correcting part 300, as shown in FIG. 2. The satellite clock correcting part 300 can be constructed and arranged to calculate a velocity of a GPS satellite, for example, based on a Doppler value. The satellite clock correcting part 300 can be constructed and arranged to correct a satellite clock based on at least one of location information and velocity information of each of one or more GPS satellites. The navigation filter 130 may calculate a pseudo-range based on the corrected satellite clock.

Figure 3:
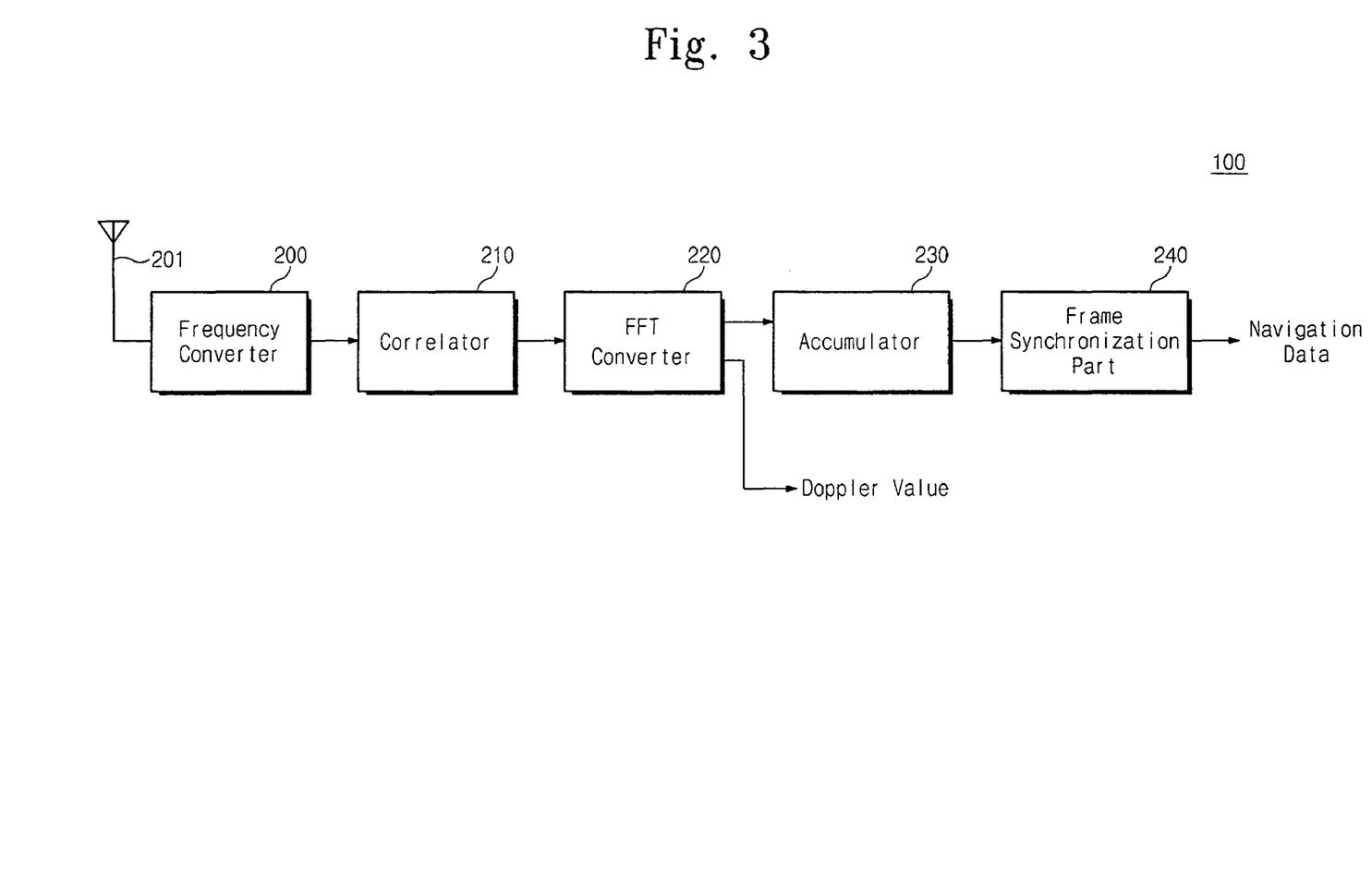
FIG. 3 is a block diagram illustrating a satellite signal receiving part illustrated in FIG. 2.

FIG. 3 is a block diagram illustrating a satellite signal receiving part 100 illustrated in FIG. 2.

Referring to FIG. 3, a GPS receiving part 100 can include a frequency converter 200, a correlator 210, a FFT converter 220, an accumulator 230, and a frame synchronization part 240.

In an embodiment, an antenna 201 can be directly or indirectly coupled to the frequency converter 200. The frequency converter 200 can be constructed and arranged to convert a frequency of a satellite signal received by the antenna 201. In an embodiment, a frequency of the satellite signal received by the antenna 201 may be converted into an intermediate frequency (IF). The correlator 210 can be constructed and arranged to generate a copy satellite signal copied by iteratively shifting a phase of the IF-converted satellite signal. The correlator 210 can extract navigation data by confirming a phase coincidence degree between codes of the satellite signal and the copy satellite signal. The FFT converter 220 can apply a Fourier transform to the navigation data to measure a Doppler deviation amount. The FFT converter 220 may acquire a Doppler value by the measuring of the Doppler deviation amount. The accumulator 230 can be constructed and arranged to accumulate the navigation data. The accumulator 230 may function as a buffer which accumulates and stores the given amount of navigation data. The frame synchronization part 230 can be constructed and arranged to acquire frame synchronization of the navigation data. In acquiring frame synchronization, the frame synchronization part 230 can output the navigation data according to a frame, for example, described below.

Figure 4:
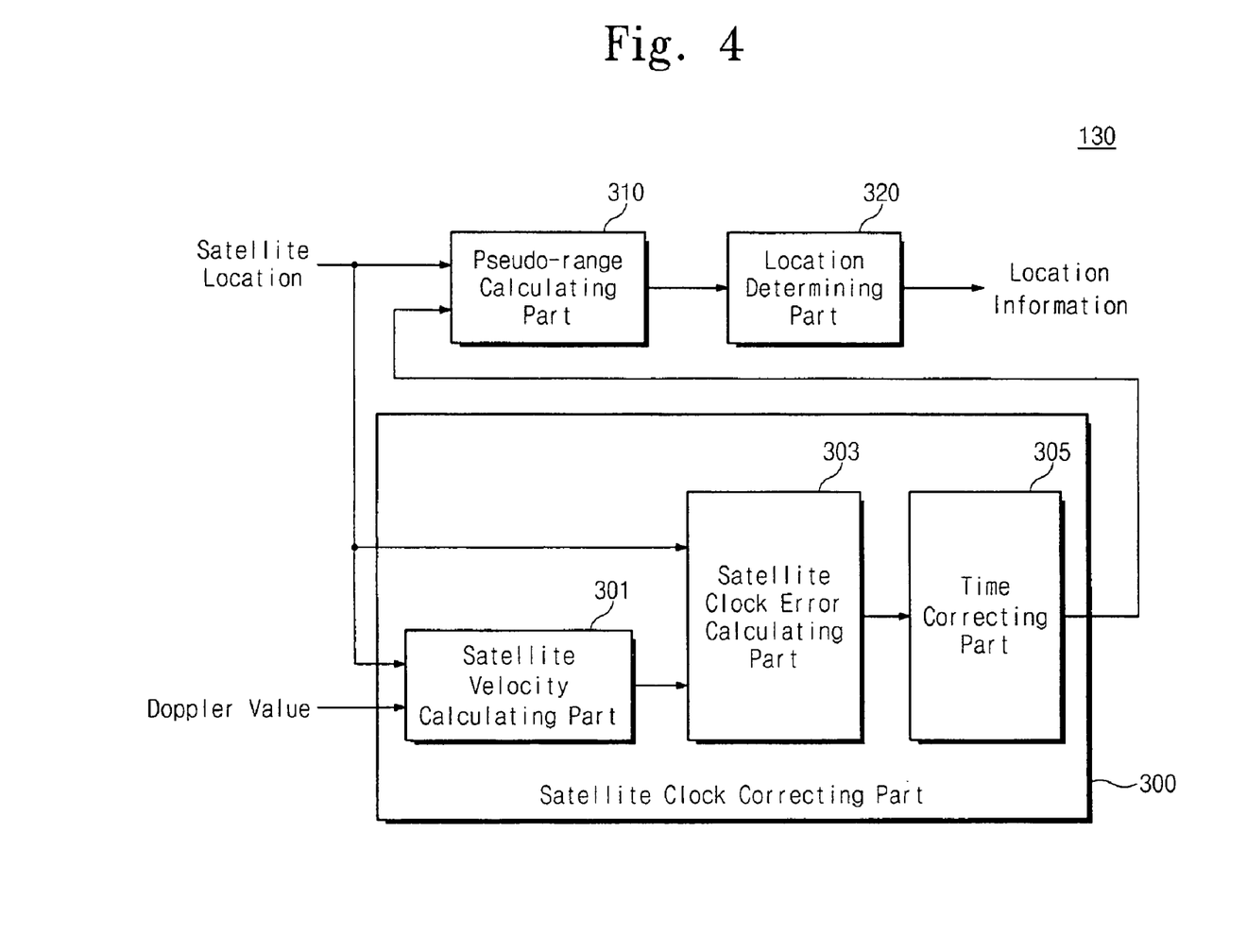
FIG. 4 is a block diagram illustrating a navigation filter illustrated in FIG. 2.

FIG. 4 is a block diagram illustrating a navigation filter 130 illustrated in FIG. 2.

Referring to FIG. 4, the navigation filter 130 can include a satellite clock correcting part 300, a pseudo-range calculating part 310, and a location determining part 320.

The satellite clock correcting part 300 can be constructed and arranged to correct a satellite clock using satellite location information and a Doppler value. The satellite clock correcting part 300 can include a satellite velocity calculating part 301, a satellite clock error calculating part 303, and a time correcting part 305.

The satellite velocity calculating part 301 can be constructed and arranged to calculate a velocity of a GPS satellite. The satellite velocity calculating part 301, for example, may differentiate the location information of the GSP satellite to calculate the satellite velocity. It is possible to configure the satellite velocity calculating part 301 so as to calculate the satellite velocity based on Almanac information or Ephemeris information included in navigation data. Further, it is possible to configure the satellite velocity calculating part 301 so as to employ the Doppler value provided from a GPS signal receiving part 100 in FIG. 2 when calculating a velocity of a GPS satellite.

The satellite clock error calculating part 303 can be constructed and arranged to calculate a satellite clock error based on a location and a velocity of a GPS satellite. The satellite clock error may used to calculate a satellite clock offset as a relative correction time.

Prior to describing calculation of a satellite clock error by the satellite clock error calculating part 303, a conventional manner of calculating a satellite clock error is expressed by the following equation.

$$\Delta t_r = Fe(A)^{\frac{1}{2}} \sin Ek \qquad \text{[Equation 1]}$$

In the equation 1, $\Delta t_r$ is a satellite clock error, and e, A and Ek are parameters of navigation data (for example, the second sub-frame or the third sub-frame) received from a satellite.

$$F = (-lu^{\frac{1}{2}})/C^2 = -4.442807633(10)^{-10} \text{ sec/(meter)}^{\frac{1}{2}} \qquad \text{[Equation 2]}$$

wherein, u=3.986005×10$^{14}$ (meter$^3$/second$^2$)

In the equation 2, C is the speed of light, for example, 3×10$^8$ m/s. u is a parameter value for the gravity of the earth.

$$\Delta t_r = -((\alpha P \times V)/C^2) \qquad \text{[Equation 3]}$$

In the equation 3, $\Delta t_r$ is a satellite clock error, P is a satellite location, V is a satellite velocity, and C is the speed of light. The satellite clock error is obtained by dividing a result of P multiplied by V by a square of C. α is and any real number, as the coefficient of a satellite clock error, multiplied to the satellite clock error to exactly calculate the satellite clock error. V is a satellite velocity onto which a Doppler value is reflected, and C is the speed of light, for example, 3×10$^8$ m/s.

As understood from the equation 3, both the satellite location and the satellite velocity are used to calculate a satellite clock error. But, it is possible to calculate the satellite clock error using any one of the satellite location and the satellite velocity.

The satellite clock error calculating part 303 can be constructed and arranged to calculate the satellite clock error according to the above-described equation 3.

The time correcting part 305 may correct the satellite clock offset, also referred to as satellite pseudo random noise (PRN) code phase time offset, using the satellite clock error. The satellite clock offset is expressed by the following equation 4.

$$\Delta t_{sv} = \alpha_{f0} + \alpha_{f1}(t-t_{oc}) + \alpha_{f02}(t-t_{oc})^2 + \Delta t_r \qquad \text{[Equation 4]}$$

In the equation 4, $\alpha_{f0}$, $\alpha_{f1}$, and $\alpha_{f2}$ are polynomial coefficients included in navigation data (for example, the first sub-frame), t is a satellite signal delay time, and $t_{oc}$ is a clock data correction time.

$$t = t_{sv} - \Delta t_{sv} \qquad \text{[Equation 5]}$$

In the equation 5, t is a satellite clock, $t_{sv}$ is an effective time, and $\Delta t_{sv}$ is a satellite clock offset. The satellite clock is a satellite time which is set within a GPS receiver.

The time correcting part 305 may correct a satellite clock using a satellite clock error as described in the equations 3 to 5.

The pseudo-range calculating part 310 may calculate a pseudo-range from a corresponding GPS satellite by multiplying the speed of light and a difference between a transmitting time and a receiving time of a satellite signal together. That is, the pseudo-range is calculated by the following equation 6.

$$P_{seudorange} = C \times (t_{received} - t_{transmitted}) \qquad \text{[Equation 6]}$$

$t_{received}$ is a time when a GPS receiver receives a satellite signal, and $t_{transmitted}$ is a time when a GPS satellite broadcasts a satellite signal. C is the speed of light, for example, 3×10$^8$ m/s.

The pseudo-range calculating part 310 may calculate the pseudo-range by measuring satellite signal transmitting and receiving times on the basis of the satellite clock corrected by the satellite clock correcting part 300. The pseudo-range calculating part 310 may calculate pseudo-ranges with respect to at least four GPS satellites, respectively.

The location determining part 320 can be constructed and arranged to determine a location of a GPS receiver using the calculated pseudo-ranges.

Figure 5:
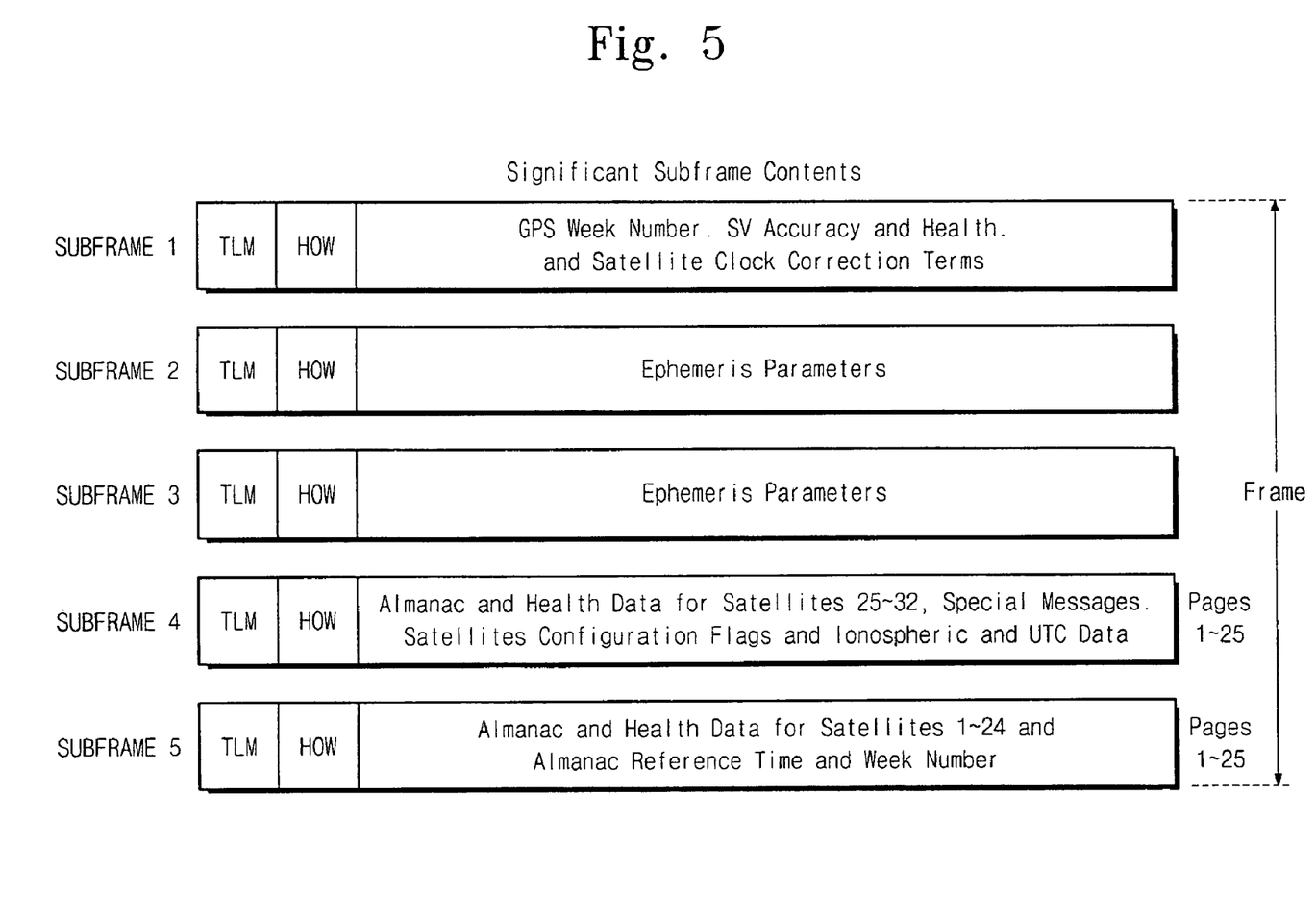
FIG. 5 is a diagram illustrating navigation data according to an embodiment.

FIG. 5 is a diagram illustrating navigation data according to an embodiment.

Referring to FIG. 5, navigation data, that is, a navigation message includes a series of frames, each of which is formed of five sub-frames. The navigation data can be included in a signal provided by a satellite, for example, satellite 20 shown in FIG. 1.

In an embodiment, one frame consists of 1,500 bits, and its period is 30 seconds. Each of the first to fifth sub-frames consists of 300 bits, and its period is 6 seconds.

The first to fifth sub-frames include the following information.

The first sub-frame includes a GPS week number, SV accuracy and health, and satellite clock correction terms. The second and third sub-frames include ephemeris parameters, respectively. The ephemeris parameters include orbital information of a satellite where there is recorded an orbit of an astronomical object with the lapse of time, and is used as predictive information for an orbit to be shifted later. The ephemeris parameters are recorded every 30 seconds, and consist of 16 keplerian elements. Thus, the ephemeris parameters are information which is not used after a time elapses.

The fourth sub-frame includes almanac and health data for satellites 25 to 32, special messages, satellites configuration flags, and Ionospheric and UTC data. The fifth sub-frame includes almanac and health data for satellites 1 to 24 and almanac reference time and week number.

Each of the fourth and fifth sub-frames is 25 pages, which is the amount of data used to acquire perfect almanac data. The almanac data includes general information for all satellites. Further, the first to fifth sub-frames include telemetry (TLM) as information for frame acquisition and handover word (HOW) as a handover flag for inter-satellite handover, respectively.

In an exemplary embodiment, in the event that a satellite clock offset is calculated using a satellite clock error, it is possible to calculate the satellite clock offset using polynomial coefficients $\alpha_{f0}$, $\alpha_{f1}$, and $\alpha_{f2}$ which are included in the first sub-frame.

Figure 6:
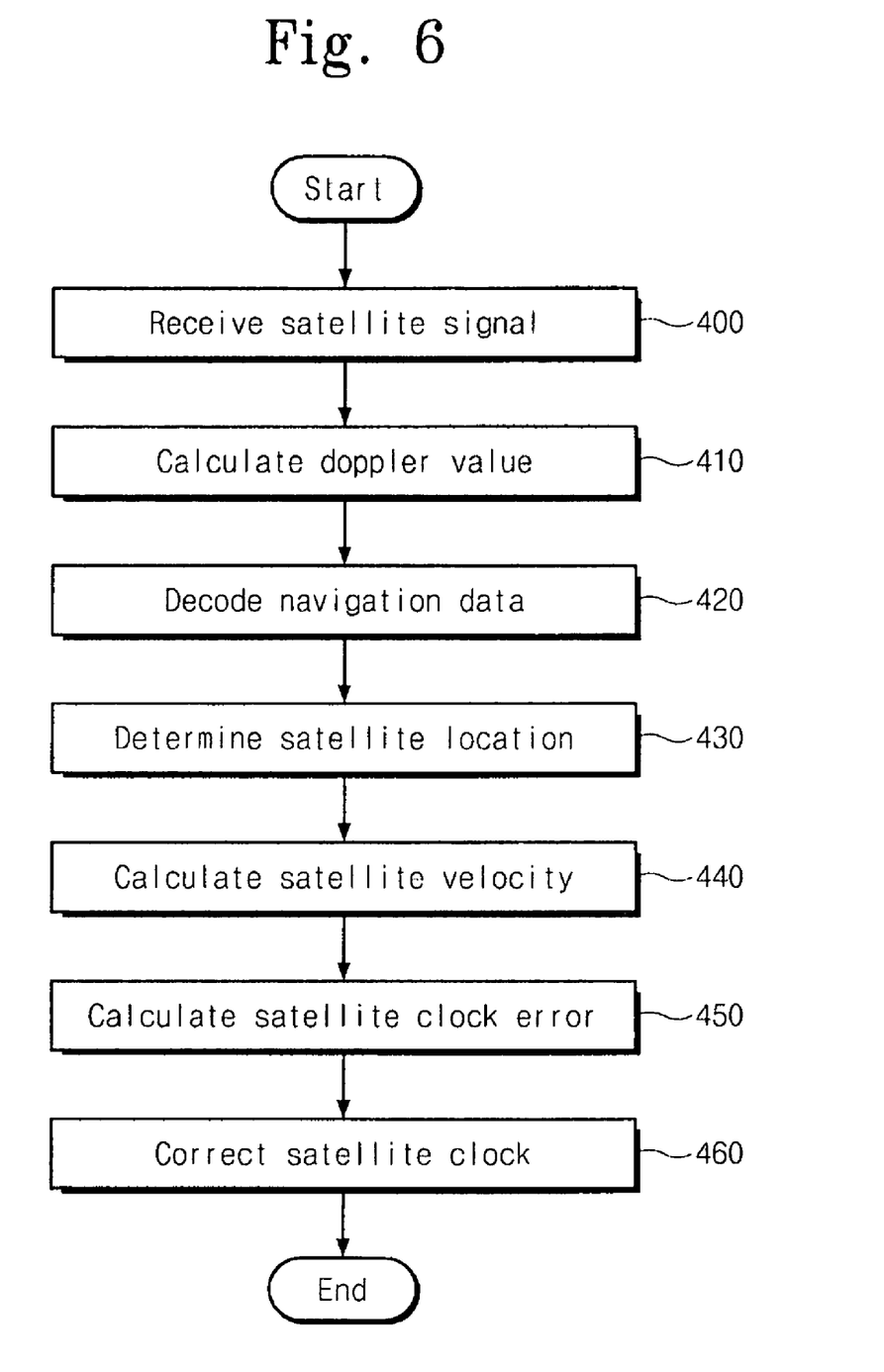
FIG. 6 is a flowchart illustrating a satellite clock correcting operation of a GPS receiver according to an embodiment.

FIG. 6 is a flowchart showing a satellite clock correcting operation of a GPS receiver according to an embodiment.

Referring to FIG. 6, in step 400, a GPS receiver 10 can receive a satellite signal. The GPS receiver 10 can extract navigation data from the incoming satellite signal. For example, the GPS receiver 100 may extract the navigation data by comparing the incoming satellite signal with a copy satellite signal.

In subsequent step 410, the GPS receiver 10 can calculate a Doppler value. The GPS receiver 10 can perform a Fourier transform on the navigation data to measure a Doppler deviation amount and acquire a Doppler value according to the measured Doppler deviation amount.

In step 420, the GPS receiver 10 can decode the navigation data. Then, the procedure advances to step 430, in which the GPS receiver 10 can determine a satellite location-in-space based on the navigation data. For example, the GPS receiver 10 can determine the satellite location-in-space using at least one of Almanac information and Ephemeris information of the navigation data.

In step 440, the GPS receiver 10 can calculate a satellite velocity. The GPS receiver 10 can calculate the satellite velocity by reflecting the extracted Doppler value when calculating a satellite velocity. The GPS receiver 10 can differentiate the location information of a satellite to calculate the satellite velocity.

In subsequent step 450, the GPS receiver 10 can calculate a satellite clock error. For example, as described in equation 3 above, the GPS receiver 10 can calculate the satellite clock error by dividing a result of a satellite velocity multiplied by a satellite location by a square of the speed of light. It is possible to additionally set a negative value to the satellite clock error or to multiply a given constant value thereto. Herein, it is possible to calculate the satellite clock error based on at least one of the satellite velocity and the satellite location.

In step 460, the GPS receiver 10 can correct a satellite clock. The GPS receiver 10 can calculate pseudo-ranges from GPS satellites based on the corrected satellite clock and determine a location of the GPS receiver 10 based on the pseudo-ranges from the GPS satellites. Since the GPS receiver 10 corrects a satellite clock using satellite location and velocity, it is possible to exactly determine a location of the GPS receiver 10 based on actual satellite circumstances.

Figure 7A:
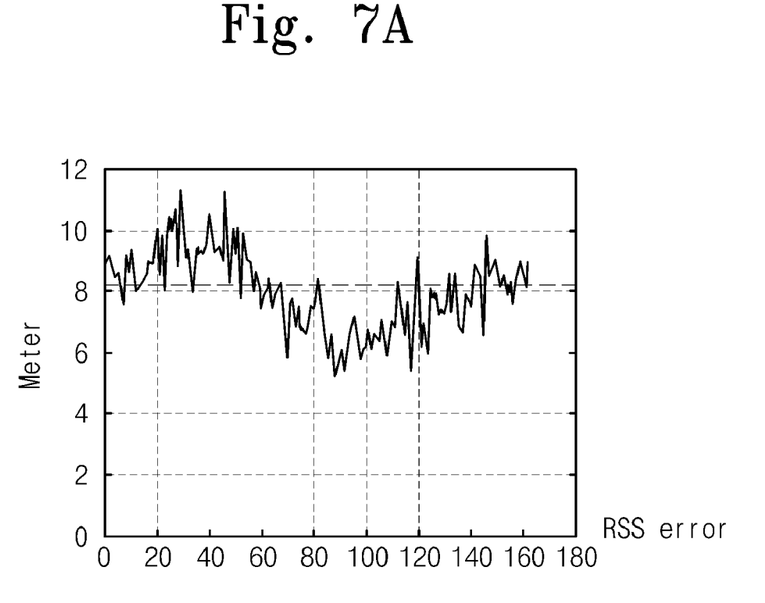
FIG. 7A is a graph illustrating a location error of a GPS receiver acquired by conventional satellite clock correction.

FIG. 7A is a graph illustrating a location error of a GPS receiver acquired by conventional satellite clock correction.

Referring to FIG. 7A, a vertical axis indicates a meter, and a horizontal axis indicates a received signal strength (RSS) error.

In the event that a satellite clock is corrected using navigation data, an RSS error of about 8.2 m can occur when a location of a GPS receiver is determined.

Figure 7B:
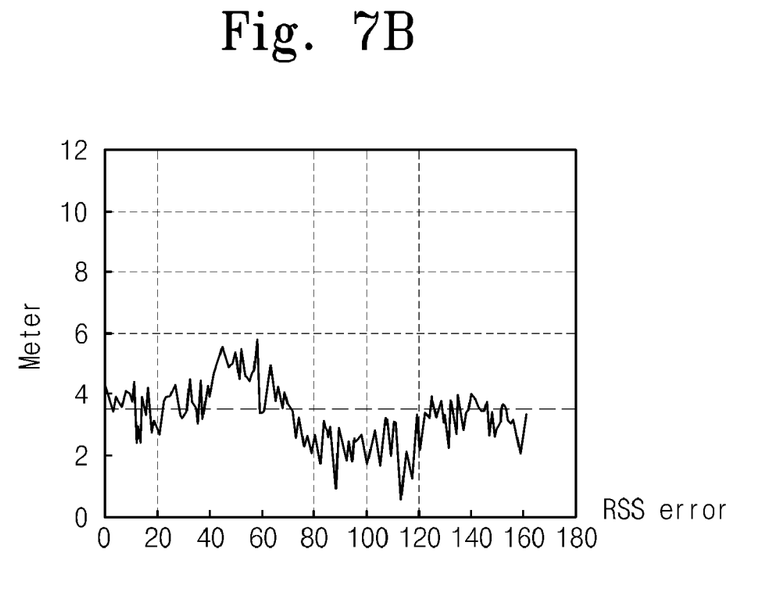
FIG. 7B is a graph illustrating a location error of a GPS receiver acquired by satellite clock correction according to an embodiment.

FIG. 7B is a graph illustrating a location error of a GPS receiver acquired by satellite clock correction according to an embodiment of the inventive concept.

Referring to FIG. 7B, a vertical axis indicates a meter, and a horizontal axis indicates a received signal strength (RSS) error.

In the event that a satellite clock is corrected using satellite location and velocity, an RSS error of about 3.7 m can occur when a location of a GPS receiver is determined. Accordingly, it is possible to reduce an error with regard to determining a location by using the satellite location and velocity at satellite clock correction as compared with the case of using navigation data at satellite clock correction.

The above-disclosed subject matter is to be considered illustrative of exemplary embodiments, and not to be construed as being restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A global positioning system receiver comprising:
a satellite signal receiving part constructed and arranged to extract navigation data from a satellite signal received from at least one satellite;
a decoder constructed and arranged to decode the navigation data;
a satellite location determining part constructed and arranged to determine a location of the at least one satellite according to the decoded navigation data; and
a satellite clock correcting part constructed and arranged to calculate a velocity of the at least one satellite and to correct a satellite clock based on a satellite clock error, wherein the satellite clock error is determined by dividing a result of the calculated satellite velocity and the determined satellite location by a square of the speed of light.

2. The global positioning system receiver of claim 1, wherein the satellite clock correcting part comprises:
a satellite velocity calculating part constructed and arranged to calculate the satellite velocity;
a satellite clock error calculating part constructed and arranged to calculate the satellite clock error based on the at least one of the calculated satellite velocity and the satellite location; and
a time correcting part constructed and arranged to correct the satellite clock based on the satellite clock error.

3. The global positioning system receiver of claim 2, wherein the satellite signal receiving part comprises:
a correlator constructed and arranged to extract the navigation data based on a coincidence degree between a code of the satellite signal and a code of a copy satellite signal; and
a FFT converter constructed and arranged to acquire a Doppler value by Fast Fourier transformation of the navigation data.

4. The global positioning system receiver of claim 3, wherein the satellite velocity calculating part is constructed and arranged to calculate the satellite velocity based on the Doppler value.

5. A method of correcting a satellite clock of a global positioning system receiver, comprising:
extracting navigation data from a satellite signal of at least one satellite;
decoding the navigation data;
determining a location of the at least one satellite according to the decoded navigation data;
calculating a velocity of the at least one satellite;
calculating a satellite clock error based on at least one of the velocity of the at least one satellite and the location of the at least one satellite, wherein the satellite clock error is determined by dividing a result of the satellite velocity and the satellite location by a square of the speed of light; and
correcting a satellite clock based on the satellite clock error.

6. The method of claim 5, wherein extracting the navigation data comprises:
extracting the navigation data based on a coincidence degree between a code of the satellite signal and a code of a copy satellite signal; and
acquiring a Doppler value by Fast Fourier transformation of the navigation data.

7. The method of claim 6, wherein calculating the satellite velocity includes calculating the satellite velocity based on the Doppler value.

8. A method of correcting a satellite clock of a global positioning system receiver, comprising:
acquiring a Doppler value from a satellite signal of at least one satellite;
calculating a velocity of the at least one satellite based on the Doppler value;
calculating a satellite clock error based on at least one of the velocity and a location of the at least one satellite, wherein the satellite clock error is determined by dividing a result of the velocity and the location by a square of the speed of light; and correcting a satellite clock based on the satellite clock error.

9. The method of claim 8, wherein the Doppler value is determined by Fast Fourier transformation of navigation data extracted from the satellite signal.

10. The method of claim 8, further comprising:
calculating a pseudo-range from the at least one satellite based on the corrected satellite clock; and
determining a location of the global positioning system receiver based on the pseudo-range.

* * * * *